United States Patent [19]

Seo et al.

[11] Patent Number: 5,286,558

[45] Date of Patent: Feb. 15, 1994

[54] MAT FOR FRAME

[75] Inventors: Toshihiko Seo; Atsuo Seo, both of Nagoya, Japan

[73] Assignees: Goshikaisha Seo Seigakusho, Nagoya, Japan; Garrett Moulding Company, Inc., Santa Cruz, Calif.

[21] Appl. No.: 895,030

[22] Filed: Jun. 8, 1992

[30] Foreign Application Priority Data

Jan. 8, 1992 [JP] Japan .................. 4-004073

[51] Int. Cl.$^5$ .................. A47G 1/12; A47G 1/06; B32B 3/16; B32B 3/26
[52] U.S. Cl. .................. 428/304.4; 428/284; 428/285; 428/286; 428/287; 428/13; 428/27; 428/68; 428/74; 428/77; 428/78; 428/119; 428/138; 428/139; 40/152
[58] Field of Search .............. 428/68, 74, 77, 78, 428/119, 138, 139, 284, 285, 286, 287, 304.4, 13, 27; 40/152

[56] References Cited

U.S. PATENT DOCUMENTS

| | | | |
|---|---|---|---|
| 3,956,838 | 5/1976 | Gerrish | 428/14 |
| 4,824,507 | 4/1989 | D'Amico | 428/74 |
| 4,844,964 | 7/1989 | Jurrus | 428/251 |
| 4,983,442 | 1/1991 | Patel et al. | 428/119 |
| 4,992,320 | 2/1991 | Gower | 428/68 |

*Primary Examiner*—George F. Lesmes
*Assistant Examiner*—Kathryne E. Shelborne
*Attorney, Agent, or Firm*—Armstrong, Westerman, Hattori, McLeland & Naughton

[57] ABSTRACT

A mat for a frame includes a mat frame made of frame elements, each having a foaming synthetic resin substrate which has predetermined thickness and width and which is covered by a neutral paper. The frame elements are cut at a predetermined length and a predetermined angle to form a predetermined shape of a mat frame.

10 Claims, 2 Drawing Sheets

MAT FOR FRAME

BACKGROUND OF THE INVENTION

1. Field of the Invention

The present invention relates to a mat for a frame, for example an archival frame, such as an oil painting or water color painting frame.

2. Description of Related Art

A known mat of an archival frame is usually made of a plate of timber, such as a veneer or cryptomeria (Japanese cedar) or a sheet of pasteboard, which is cut or punched into a predetermined shape having a rectangular or square mat window corresponding to a size of an artwork, such as a painting or poster to be mounted in the frame.

In such a known mat for an archival frame, there is a large uneconomic loss of material of which the mat is made due to the cutting or punching. Furthermore, it is very difficult to easily realize a complex shape of the mat window, e.g., polygonal mat window.

In addition to the foregoing, upon trimming the mat window, the peripheral oblique edge of the mat window wears, thus resulting in an irregular thickness or obliquity thereof. This results in an adverse aesthetic influence on appearance of the frame.

Furthermore, the mat becomes large as the size of the associated artwork increases, and such a large mat makes the frame heavy and inconvenient for carriage and maintenance thereof.

The conventional mat made of a plate of timber or pasteboard has a rough surface, and accordingly, not only the portion of the artwork with which the mat is brought into press-contact is damaged by the rough surface, but also the aging in chemical property of paints painted on the surface of the mat or an adhesive immersed into the mat occurs, thus resulting in a discolored or faded artwork.

The primary object of the present invention is to eliminate the drawbacks mentioned above by providing a light, simple and easily portable and maintainable mat for a frame, in which no damage of an artwork mounted in the frame takes place, and which can be easily formed into any complex shapes depending on the artwork with a least loss of material.

SUMMARY OF THE INVENTION

To achieve the object mentioned above, according to the present invention, there is provided a mat for a frame comprising a mat frame made of frame elements, each having a foamed synthetic resin substrate which has predetermined thickness and width and which is covered by a neutral paper, wherein said frame elements are cut at a predetermined length and a predetermined angle to form a predetermined shape of a mat frame.

BRIEF DESCRIPTION OF THE DRAWINGS

The invention will be described below in detail with reference to the accompanying drawings, in which.

DESCRIPTION OF THE PREFERRED EMBODIMENTS

Figure 1:
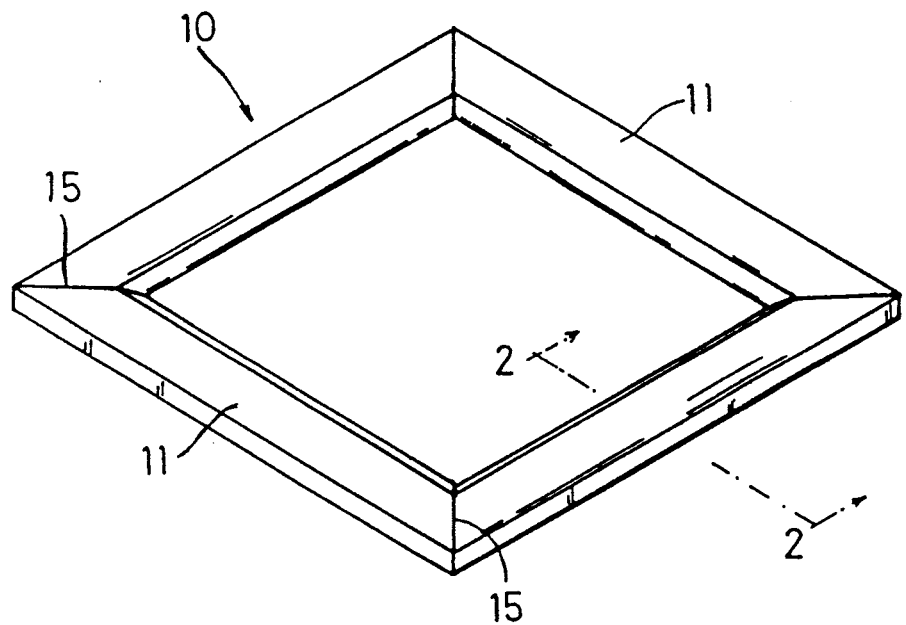
FIG. 1 is a perspective view of a mat for an archival frame according to the present invention.
Figure 2:
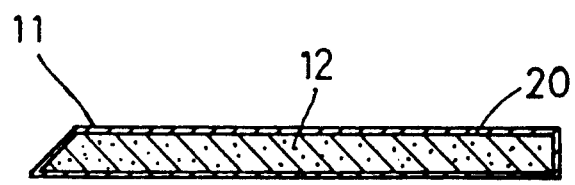
FIG. 2 is a cross sectional view taken along the line 2—2 in FIG. 1.

In FIGS. 1 and 2, a mat 10 for an archival frame is made of frame elements 11, each having a predetermined length and opposite ends 15 cut at a predetermined angle. The frame elements 11 are connected to each other at their inclined ends 15 to form a predetermined shape of mat frame, e.g., a rectangular or square mat frame.

In the illustrated embodiment, the rectangular mat 10 of 4M×2.4M is made of four frame elements 11, each having a 10 mm thickness and a 70 mm width.

Each of the frame elements 11 is made of an elongated foamed synthetic resin substrate 12 of uniform thickness and width which is entirely covered by a neutral paper 20. The foamed synthetic resin substrate 12 is preferably made of a low foamed polystyrene sheet which is light, can be easily cut or formed into a desired shape and has a strength substantially identical to that of veneer or cryptomeria (Japanese cedar), etc., of which the conventional mat is made.

As mentioned above, the neutral paper 20 which is made of, for example, a nonacid paper, covers the whole surface of the foamed synthetic resin substrate 12 including the rear surface thereof which comes into contact with an artwork to be mounted in the archival frame to protect the artwork.

The surface of the neutral paper 20 can be covered by a cloth or the like applied thereto, or resin paints or water paints sprayed thereon to color the neutral paper.

Figure 3:
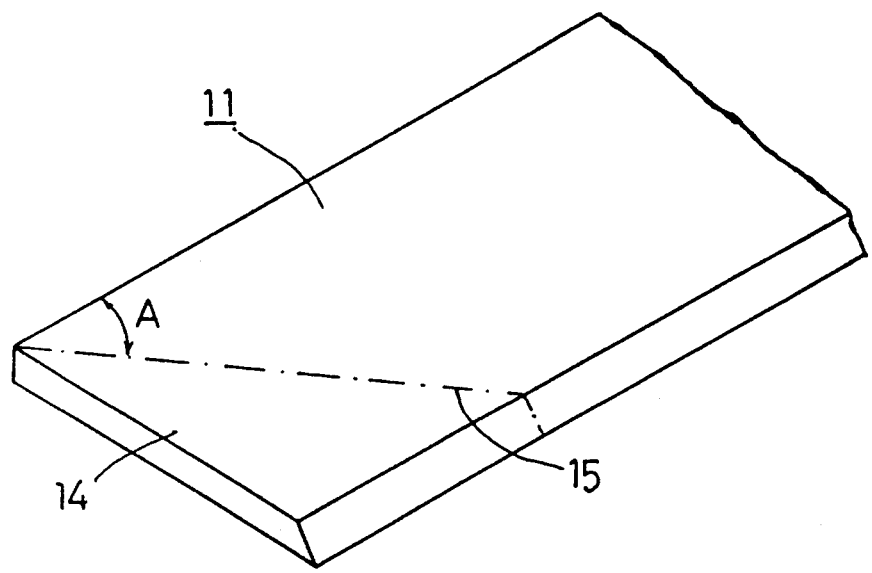
FIG. 3 is a perspective view of a mat frame by way of example, according to the present invention; and, FIG. 4 is a plan view of another example of a mat frame according to the present invention.

The frame element 11 is cut at a predetermined angle A at the end 14 thereof, depending on the shape of the associated artwork to be mounted in the archival frame, as shown in FIG. 3. The cut ends 15 of the frame elements 11 are interconnected by an adhesive, such as hot-melt adhesive or a mechanical connecting means, such as nails, etc. to form a desired shape of mat frame for an archival frame.

In the illustrated embodiment, the inclination angle A of the frame element 11 is 45° with respect to the direction of the length thereof.

The angle A can be optionally selected to provide a complex shape of mat, for example a polygonal mat for an archival frame.

Figure 4:
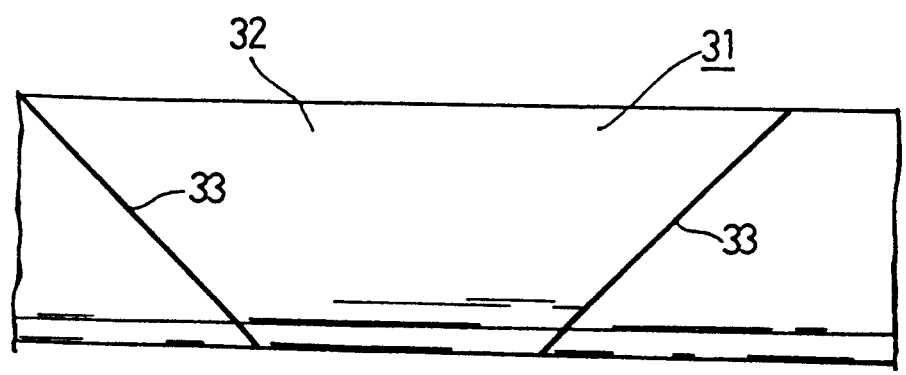

FIG. 4 shows a modified example of a mat frame 31 which is made of substrate pieces 32 of foaming synthetic resin, each having uniform thickness and width. Namely, each side of the mat frame 31 is made of a plurality of substrate pieces 32 which are continuously connected to each other at the oblique ends 33 thereof. This contributes to an increase in a degree of freedom to form a desired shape of mat and a decrease in material loss. Namely, the material of mat to be cut and removed to form a desired shape thereof can be reduced.

As can be understood from the above discussion, according to the present invention, since the mat frame is made of frame elements, each having a foamed synthetic resin substrate which has a predetermined thickness and width and which is covered by neutral paper, and the frame elements which are cut at a predetermined length and a predetermined angle are connected to each other to form a predetermined shape of mat, a mat for an archival frame can be more inexpensively manufactured than the conventional mat made of veneer or cryptomeria Japanese cedar, etc. Furthermore, the frame elements can be easily cut at a predetermined length and predetermined angle by an existing cutter, such as a circular saw or a cutter for decorative moldings. In addition to the foregoing, a complex shape of mat can be easily and inexpensively obtained with a least loss of material to be cut. No wearing of the peripheral oblique edge of the mat window takes place upon trimming or cutting the mat window, thus resulting in a good appearance of the archival frame.

Furthermore, the neutral paper which covers the outer surfaces of the frame elements provides a smooth mat surface and prevents an occurrence of a chemical reaction of the paints painted on the surface of the mat or an adhesive immersed into the mat, thus resulting in no damage of the artwork and a prevention of the artwork from being discolored or faded.

Finally, since the mat according to the present invention is light, it can be easily carried and handled, and can be easily assembled. The easy assemble makes it possible to maintain and transport the frame elements and assemble a mat frame at the site. This responds to a need for a quick and mass production of the mat frames.

We claim:

1. A mat for a frame for framing artwork comprising:
a plurality of elongated frame elements, each having a foamed synthetic resin substrate which is of predetermined thickness and width, each foamed synthetic substrate being covered by a layer of neutral paper, wherein said elongated frame elements each have a predetermined length with first and second ends cut at predetermined angles with respect to said length, said plurality of frame elements for connecting end to end so as to define an open area through which the artwork to be framed can be viewed; and
wherein said foamed synthetic resin substrate of each elongated frame element is made of a sheet of low foaming polystyrene.

2. A mat for a frame according to claim 1, wherein each of said elongated frame elements has said first and second ends cut at the same predetermined angle with respect to said length.

3. A mat for a frame according to claim 2, wherein said predetermined angle of the ends of the frame elements is 45° with respect to the length.

4. A mat for a frame according to claim 3, wherein said open area defined by said plurality of frame elements is rectangular or square.

5. A mat for a frame according to claim 4, wherein each frame element has a plurality of foamed synthetic resin substrate pieces which are connected to each other to form each side of the rectangle or square.

6. A mat for a frame according to claim 1, wherein said frame elements are connected to each other at the cut ends thereof by an adhesive.

7. A mat for a frame according to claim 1, wherein said foamed synthetic resin substrate is entirely covered by the paper.

8. A mat for a frame according to claim 1, wherein said neutral paper is nonacid paper.

9. A mat for a frame according to claim 1, wherein said each of said plurality of elongated frame elements is further covered by a cloth layer over said paper layer.

10. A mat for a frame according to claim 1, wherein a resin or water paint coating is on said neutral paper.

* * * * *